United States Patent
Terasawa

(10) Patent No.: US 9,270,167 B2
(45) Date of Patent: Feb. 23, 2016

(54) POWER FACTOR CORRECTION CIRCUIT HAVING ON-PERIOD CONTROLLING

(71) Applicant: Sanken Electric Co., Ltd., Niiza-shi, Saitama (JP)

(72) Inventor: Yoichi Terasawa, Niiza-shi (JP)

(73) Assignee: Sanken Electric Co., Ltd., Niiza-shi (JP)

(*) Notice: Subject to any disclaimer, the term of this patent is extended or adjusted under 35 U.S.C. 154(b) by 64 days.

(21) Appl. No.: 14/333,972

(22) Filed: Jul. 17, 2014

(65) Prior Publication Data
US 2015/0023067 A1 Jan. 22, 2015

(30) Foreign Application Priority Data
Jul. 22, 2013 (JP) ................................. 2013-151488

(51) Int. Cl.
H02M 1/42 (2007.01)
H02M 3/335 (2006.01)
(52) U.S. Cl.
CPC .......... *H02M 1/4225* (2013.01); *H02M 1/4208* (2013.01); *H02M 3/33507* (2013.01)
(58) Field of Classification Search
CPC combination set(s) only.
See application file for complete search history.

(56) References Cited

U.S. PATENT DOCUMENTS

| 8,320,144 B2* | 11/2012 | Lee | G05F 1/70 323/207 |
| 8,867,237 B2* | 10/2014 | Desimone | H02M 1/44 363/21.05 |
| 2009/0290395 A1* | 11/2009 | Osaka | H02M 1/4225 363/126 |

FOREIGN PATENT DOCUMENTS

| JP | 2006526975 A | 11/2006 |
| JP | 2008199896 A | 8/2008 |

* cited by examiner

*Primary Examiner* — Emily P Pham
(74) *Attorney, Agent, or Firm* — Mots Law, PLLC

(57) ABSTRACT

The present invention includes: a series circuit including a reactor and a switching element connected between the rectified-current output terminals of a rectifier; a series circuit including a diode and a smoothing capacitor for obtaining an output voltage, connected in parallel to the switching element; an error amplifier configured to detect the output voltage, amplify the error between the detected output voltage and a reference voltage, and output an error signal; a zero-current detector configured to output a signal when detecting that a reactor current flowing in the reactor has become zero current; a correction signal circuit configured to detect a switching current flowing in the switching element, and generate a correction signal corresponding to the detected switching current; and an ON-period control circuit configured to control the switching element's ON period in accordance with the error signal and correction signal, from when the zero-current detector detects the zero current.

8 Claims, 7 Drawing Sheets

POWER FACTOR CORRECTION CIRCUIT HAVING ON-PERIOD CONTROLLING

TECHNICAL FIELD

The present invention relates to a power-factor correction circuit.

BACKGROUND ART

Conventional power-factor correction circuits generally employ a method in which current peaks of a switching element are made proportional to an input instantaneous voltage. According to this method, it is theoretically possible to obtain an input current that is proportional to the input instantaneous voltage.

FIG. 1 is a diagram showing an example of such a conventional power-factor correction circuit. In this power-factor correction circuit, it is detected that a current flowing in a reactor L2 has reached zero, when the voltage of an auxiliary winding Nd of the reactor L2 reaches or falls below a threshold Vth. When the current of the reactor L2 reaches zero, a flip-flop circuit FF1 is set to turn on a switching element Q1. In this way, the switching current of the switching element Q1 appears as a triangle-wave signal starting from zero.

Moreover, a switching element Q2 is turned off using an inverted signal from an inverter circuit INV1 at the same time as when the switching element Q1 is turned on. As a result, a capacitor C1 is charged with a constant current from a constant current source Ict, so that a voltage Vct of the capacitor C1 rises. A comparator CP1 compares the voltage of a capacitor C2 and the voltage Vct of the capacitor C1, and the output of the comparator CP1 shifts to a H level and resets the flip-flop circuit FF1 when the voltage Vct exceeds the voltage of the capacitor C2. As a result, the switching element Q1 is turned off. At the same time, the inverter circuit INV1 inverts a L-level signal which is the output of the flip-flop circuit FF1 and applies a H-level signal to the gate of the switching element Q2. As a result, the switching element Q2 is turned on, and the voltage Vct of the capacitor C1 is reset to zero.

As the above-described operation is repeated, the ON period of the switching element Q1 is controlled to be long when the output of an error amplifier A1 increases, and the ON period of the switching element Q1 is controlled to be short when the output of the error amplifier A1 decreases. The error amplifier A1 is configured to compare a reference voltage Vref and a value obtained by dividing the output voltage with a resistor R1 and a resistor R2, and operate in such a way that the output of the error amplifier A1 decreases as the output voltage rises, and the output of the error amplifier A1 increases as the output voltage drops.

As a result, the ON periods of the switching element Q1 are controlled such that the output voltage can be a target value which is determined by the reference voltage Vref and the ratio of voltage division by the resistor R1 and the resistor R2. During this control, the ON periods are set in such a way as to prevent response to the frequency of the AC input voltage, with the help of phase correction by the capacitor C2 provided at the output of the error amplifier A1. Accordingly, the ON periods of the switching element Q1 remain substantially the same during a half cycle of the AC input.

Since the inclination of the current flowing in the reactor L2 is proportional to the input instantaneous voltage, the switching element Q1 is controlled with substantially the same ON periods during the half cycle of the input AC voltage. Thus, as shown in FIG. 2, peaks Isw of a switching current Iin appear as triangle waves proportional to an input AC voltage instantaneous value Vin, and the average value thereof is proportional to the input AC voltage. In reality, however, stray capacitance is present in parallel with elements such as the switching element Q1, a diode D2, and the reactor L2.

For this reason, in a case where the peak current of the switching element Q1 is equal to or below a certain level, the energy stored in the reactor L2 while the switching element Q1 is turned off is all consumed to charge the stray capacitance. Consequently, the anode voltage of the diode D2 fails to exceed the output voltage, and no current flows to the output side. That no current flows to the output side means that no current flows in from the input. This leads to a phenomenon in which the input current does not flow when the input AC voltage is equal to or below a certain level (FIG. 3). Thus, there is a problem in that, in a range where the input instantaneous voltage is low, the input current does not flow, thereby resulting in a narrower conduction angle and a deteriorated power factor. Published Japanese Translation of PCT International Application No. 2006-526975 and Japanese Patent Application Publication No. 2008-199896 have been known as techniques that solve this problem.

In the circuit described in Published Japanese Translation of PCT International Application No. 2006-526975, a rectified voltage obtained by rectifying an input AC voltage is detected, and the ON period of a switching element is modified to be shorter than that determined by output voltage control when the input voltage instantaneous value is large, whereas the ON period is modified to be longer when the input voltage instantaneous value is small. In this way, when the input voltage instantaneous value is small, the switching current is increased and the time for which the input current does not flow is shortened. Accordingly, the conduction angle can be widened and the power factor can be improved.

Moreover, Japanese Patent Application Publication No. 2008-199896 utilizes a fact that a forward voltage generated in a secondary wiring of a reactor in a power-factor correction circuit when a switching element Q1 is turned on is proportional to an input instantaneous voltage. The ON period of the switching element is controlled to be long when the forward voltage of the secondary winding of the reactor is low, whereas the ON period is controlled to be short when the forward voltage is high.

In this way, in Japanese Patent Application Publication No. 2008-199896, like Published Japanese Translation of PCT International Application No. 2006-526975, in a range where the input instantaneous voltage is low, the ON period is increased, thereby providing a more current than the normal switching current which is proportional to the input instantaneous voltage. Accordingly, the conduction angle can be widened and the power factor can be improved.

However, in Published Japanese Translation of PCT International Application No. 2006-526975, a rectified voltage obtained by rectifying an alternating current is detected. The voltage of the power-factor correction circuit after the rectification is high because it is a voltage obtained by rectifying a commercial alternating current. Thus, in a case of inserting a voltage detection circuit, a circuit design and selection of components taking high voltage into consideration are necessary.

In the case of Japanese Patent Application Publication No. 2008-199896, the input voltage is not detected directly, and therefore the high-voltage problem does not occur. However, for a power-factor correction circuit for critical mode control, it is possible to employ a method in which the switching current is detected directly and the auxiliary winding of the reactor is not utilized. Then, to employ this method, a different auxiliary winding is necessary.

An object of the present invention is to provide a power-factor correction circuit capable of widening the conduction angle and improving the power factor, without detecting the input voltage or detecting the voltage of an auxiliary winding of a reactor.

SUMMARY OF INVENTION

To solve the above-described problems, a power-factor correction circuit of the present invention includes: a rectifier configured to rectify an input AC voltage; a first series circuit including a reactor and a switching element which are connected between rectified-current output terminals of the rectifier; a second series circuit including a diode and a smoothing capacitor for obtaining an output voltage, the diode and the smoothing capacitor being connected in parallel to the switching element; an error amplifier configured to detect the output voltage, amplify an error between the detected output voltage and a reference voltage, and output an error signal; a zero-current detector configured to output a signal when detecting that a reactor current flowing in the reactor has become zero current; a correction signal circuit configured to detect a switching current flowing in the switching element, and generate a correction signal corresponding to the detected switching current; and an ON-period control circuit configured to control an ON period of the switching element in accordance with the error signal and the correction signal, the control starting from when the zero-current detector detects the zero current.

Also, a power-factor correction circuit of the present invention includes: a rectifier configured to rectify an input AC voltage; a first series circuit including a reactor and a switching element which are connected between rectified-current output terminals of the rectifier; a second series circuit including a diode and a smoothing capacitor for obtaining an output voltage, the diode and the smoothing capacitor being connected in parallel to the switching element; an error amplifier configured to detect the output voltage, amplify an error between the detected output voltage and a reference voltage, and output an error signal; a zero-current detector configured to output a signal when detecting that a reactor current flowing in the reactor has become zero current; a triangle-wave generation circuit configured to generate a triangle-wave signal; a comparison unit configured to output a signal when the triangle-wave signal of the triangle-wave generation circuit matches the error signal of the error amplifier; a correction signal unit configured to detect a switching current flowing in the switching element and generate a correction signal corresponding to the detected switching current; and an ON-period control circuit configured to change an ON period of the switching element based on the correction signal, the ON period being a period starting from when the zero-current detector detects the zero current to when the comparison unit outputs the signal thereof.

DESCRIPTION OF EMBODIMENTS

Next, power-factor correction circuits according to embodiments of the present invention will be described with reference to drawings. The power-factor correction circuits of the present invention are characterized in that a switching current is detected, and a current proportional to the detected current value is added to a time constant which determines the ON period, so that the conduction angle is widened and the power factor is improved without detecting the input voltage or detecting the voltage of an auxiliary winding of a reactor. In other words, the present invention is characterized in that the ON period in a range where an input instantaneous voltage is low is increased without detecting the input voltage or detecting the voltage of the winding.

Embodiment 1

Figure 1:
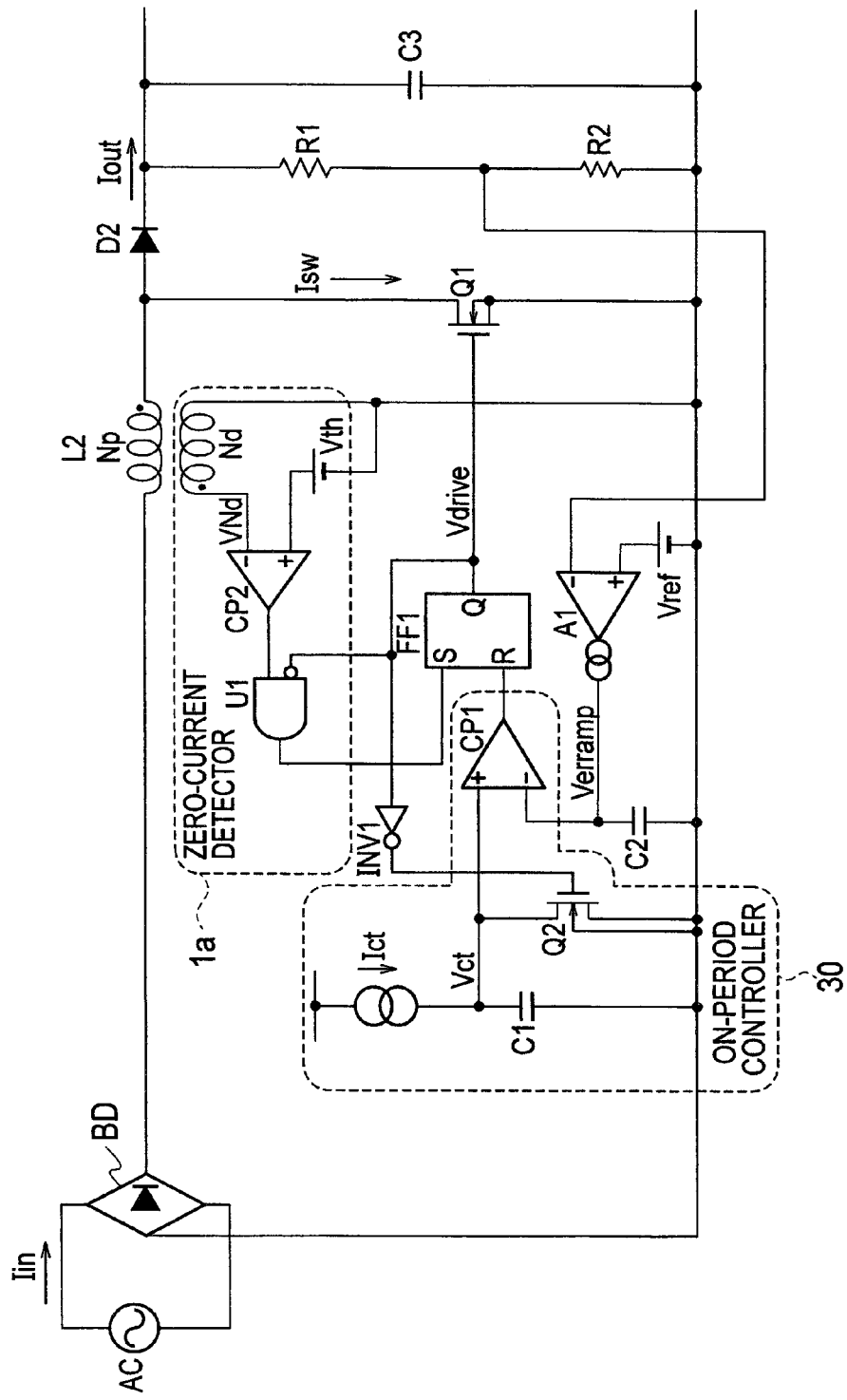
FIG. 1 is a diagram showing an example of a conventional power-factor correction circuit.
Figure 2:
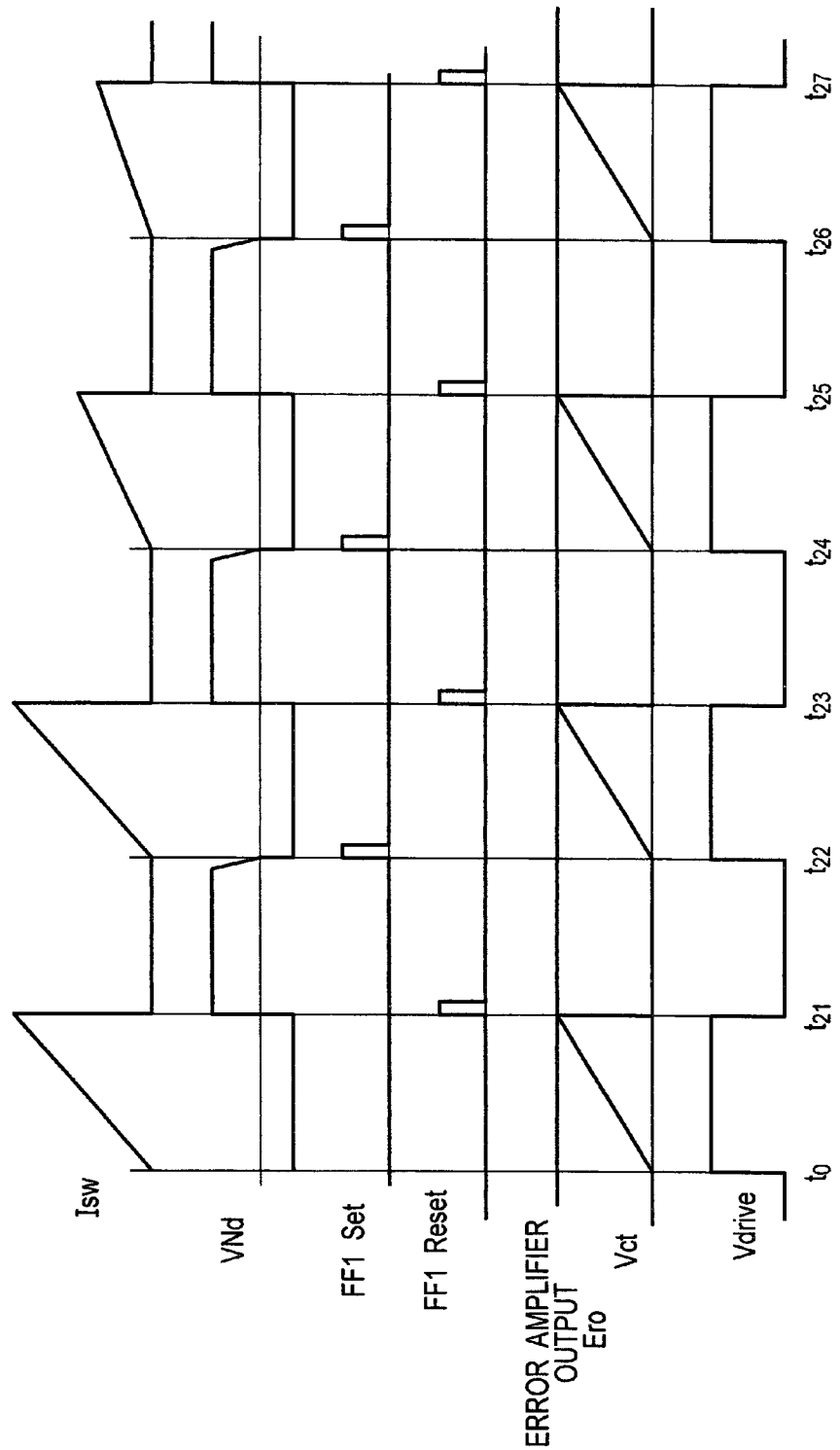
FIG. 2 shows timing charts of given parts of the conventional power-factor correction circuit shown in FIG. 1.
Figure 3:
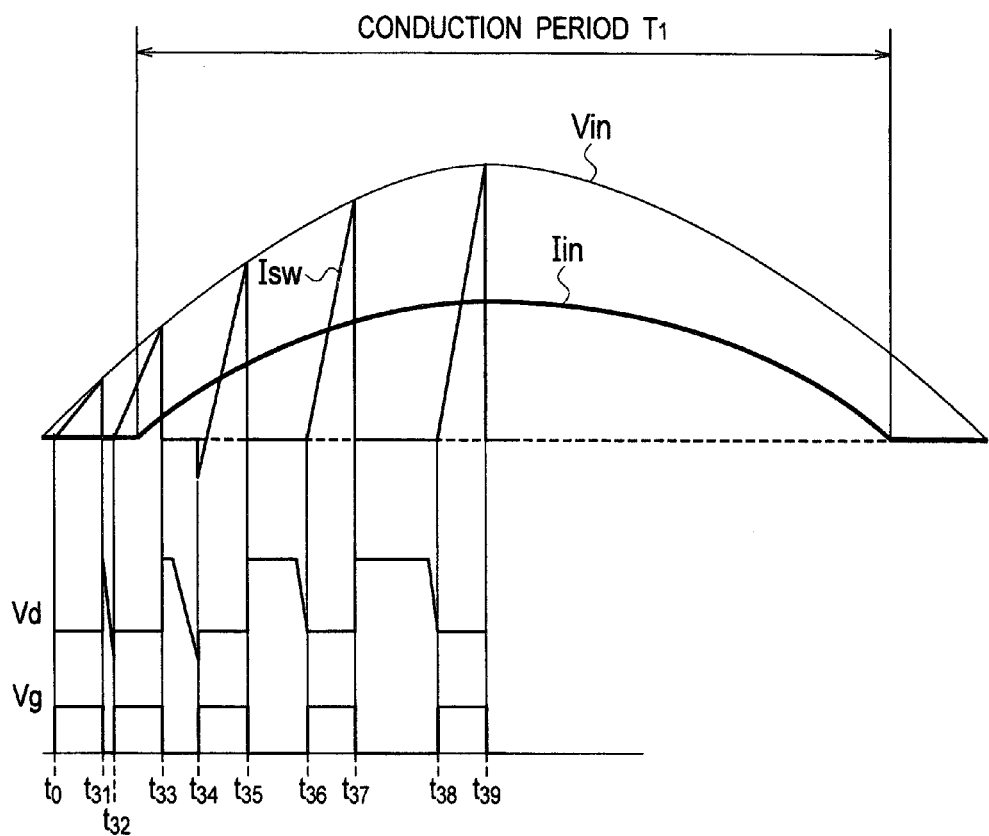
FIG. 3 shows waveform charts of an input voltage and an input current in the conventional power-factor correction circuit shown in FIG. 1.
Figure 4:
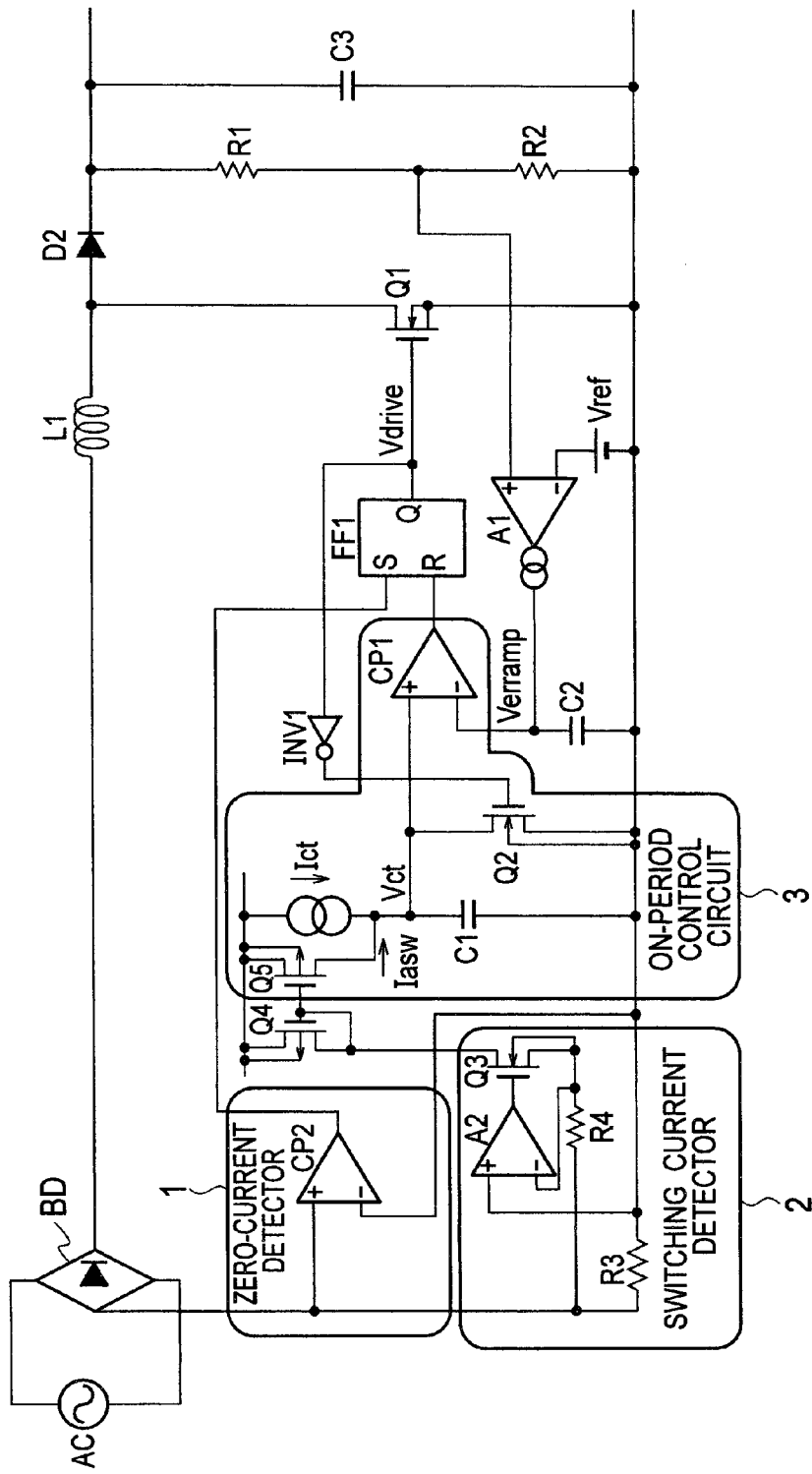
FIG. 4 is a diagram showing a power-factor correction circuit according to Embodiment 1 of the present invention.

FIG. 4 is a diagram showing a power-factor correction circuit according to Embodiment 1 of the present invention. The power-factor correction circuit according to Embodiment 1 shown in FIG. 4 includes: a full-wave rectifier ED configured to rectify the input AC voltage of an AC power source AC; a first series circuit including a reactor L1, a switching element Q1 formed of a MOSFET, and a current detection resistor R3, all of which are connected between the rectified-current output terminals of the full-wave rectifier BD; and a second series circuit including a diode D2 and a smoothing capacitor C3 connected in parallel to the switching element Q1. The output voltage is obtained between the terminals of the smoothing capacitor C3.

A resistor R1 and a resistor R2 in series configured to divide and detect the output voltage are connected between the terminals of the smoothing capacitor C3. The voltage divided by the resistor R1 and the resistor R2 in series is connected to the non-inverting terminal of an error amplifier A1.

The error amplifier A1 is configured to operate in such a way as to lower its output when the divided voltage is higher than a reference voltage Vref and raise the output when the divided voltage is lower than the reference voltage Vref. A capacitor C2 is connected to the output of the error amplifier A1, and the capacity of the capacitor C2 is set such that response to the input AC frequency is prevented. The error amplifier A1 detects the divided voltage obtained by dividing the output voltage with the resistor R1 and the resistor R2, amplifies the error voltage between the detected voltage and the reference voltage Vref, and outputs the obtained error signal to the capacitor C2.

A zero-current detector 1 includes a comparator CP2. One end of the current detection resistor R3 and the negative output terminal of the full-wave rectification circuit BD are connected to the non-inverting input terminal of the comparator CP2, while the other end of the current detection resistor R3 and the source of the switching element Q1 are connected to the inverting input terminal of the comparator CP2. The comparator CP2 is configured to detect drop in the voltage of the current detection resistor R3, detect that a reactor current flowing in the reactor L1 has become zero current when the voltage drop becomes zero, and output a H-level signal to a set terminal S of a flip-flop circuit FF1.

The flip-flop circuit FF1 is configured to output a H-level signal to its output terminal Q to turn on the switching element Q1 when a H-level signal is inputted to the set terminal S. The flip-flop circuit FF1 is configured to output a L-level signal to the output terminal Q to turn off the switching element Q1 when a H-level signal is inputted to a reset terminal R. An inverter circuit INV1 is configured to invert the output of the output terminal Q of the flip-flop circuit FF1, and apply the inverted output to the gate of a switching element Q2.

A switching current detector 2 corresponds to correction signal unit of the present invention, and includes the current detection resistor R3, a resistor R4, an error amplifier A2, and an N-type MOSFET Q3. One end of the resistor R4 is connected to the one end of the resistor R3 while the other end of the resistor R4 is connected to the inverting input terminal of the error amplifier A2 and the source of the N-type MOSFET Q3. The other end of the current detection resistor R3 and the source of the switching element Q1 are connected to the non-inverting input terminal of the error amplifier A2, while the other end of the resistor R4 and the source of the switching element Q3 are connected to the inverting input terminal of the error amplifier A2. The error amplifier A2 is configured to detect a switching current flowing in the switching element Q1, and amplify a voltage corresponding to the detected switching current to turn on the MOSFET Q3.

In this case, the error amplifier A2 applies the voltage to the gate of the MOSFET Q3 and causes a current to flow thereinto based on the switching current flowing in the current detection resistor R3 such that the voltage drop of the resistor R4 will be the same value as the voltage drop of the resistor R3.

The gate and drain of a P-type MOSFET Q4 are connected to the source of the MOSFET Q3. A power source is applied to the source of the MOSFET Q4. The gate of a MOSFET Q5 is connected to the gate and drain of the MOSFET Q4. The power source is connected to the source of a MOSFET Q5, and a constant current source Ict is connected between the source and drain of the MOSFET Q5. The MOSFET Q4 and the MOSFET Q5 form a mirror circuit. Specifically, the error amplifier A2 and the MOSFETs Q3 to Q5 form the correction signal unit of the present invention, which is configured to generate a correction current Iasw as a correction signal corresponding to the switching current, add this correction current Iasw to the constant current of the constant current source Ict, and cause the added current flow into a capacitor C1. In other words, the correction signal unit changes the ON period of the switching element Q1 such that the larger the switching current flowing in the switching element Q1, the shorter the ON period of the switching element Q1.

An ON-period control circuit 3 is formed by the MOSFET Q5, the constant current source Ict, the capacitor C1, the switching element Q2, and a comparator CP1. The capacitor C1 is connected in series to the constant current source Ict. The drain of the switching element Q2 formed of an N-type MOSFET is connected to one end of the capacitor C1, while the source of the switching element Q2 is connected to the other end of the capacitor C1. Moreover, the constant current source Ict, the capacitor C1, and the switching element Q2 form a triangle-wave generation circuit configured to generate triangle-wave signals.

The ON-period control circuit 3 is configured to control the ON period of the switching element Q1 in accordance with the error signal from the error amplifier A1 and the correction signal from the mirror circuit Q4, Q5, the control starting from when the zero-current detector 1 detects zero current, i.e. from when the flip-flop circuit FF1 is set and the switching element Q2 is turned off by a signal from the inverter circuit INV1. The capacitor C1 corresponds to an integration circuit of the present invention and configured to start integration of the constant current in response to output of a signal from the zero-current detector 1.

The comparator CP1 is configured to compare the output signal of the error amplifier A1 and the integration value of the capacitor C1, and output a H-level signal to the reset terminal R of the flip-flop circuit FF1 to turn off the switching element Q1 when the voltage of the capacitor C2, which is the output signal of the error amplifier A1, and the voltage of the capacitor C1 match each other.

Specifically, the ON-period control circuit 3 controls the switching element Q1 such that the switching element Q1 is turned on for an ON period which is a period from when the zero-current detector 1 detects zero current to when the comparator CP1 outputs a H-level signal. Moreover, while the switching element Q1 is turned off, the ON-period control circuit 3 turns on the switching element Q2 by using a H-level signal from the inverter circuit INV1 to reset the electric charge of the capacitor C1.

Figure 5:
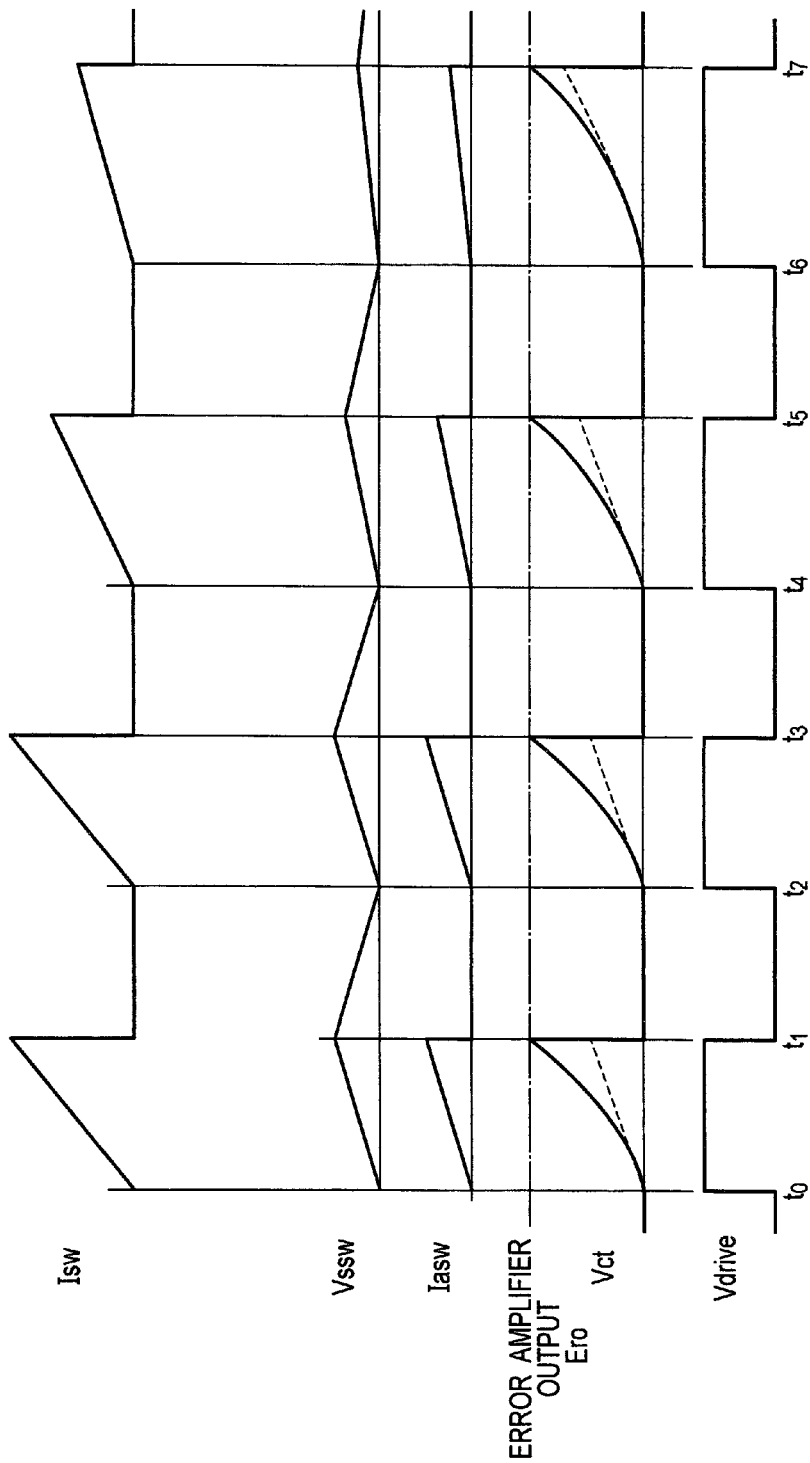
FIG. 5 shows timing charts of given parts of the power-factor correction circuit according to Embodiment 1 of the present invention.

Next, the operation of the power-factor correction circuit of Embodiment 1 configured as above will be described in detail with reference to timing charts shown in FIG. 5 and waveform charts of the input voltage and input current shown in FIG. 6. In FIG. 5, Isw denotes the current flowing in the switching element Q1, Vssw denotes the voltage between both ends of the resistor R3, Iasw denotes the correction current value, Vct denotes the voltage of the capacitor C1, and Vdrive denotes the output of the flip-flop circuit FF1.

First, as no current flows into the switching element Q1, the voltage Vssw between both ends of the current detection resistor R3 drops to zero, and therefore the comparator CP2 detects that the voltage between both ends of the current detection resistor R3 has dropped to zero. In response, a H-level signal is outputted from the output terminal of the comparator CP2 to the set terminal S of the flip-flop circuit FF1, so that the switching element Q1 starts to be on. Accordingly, the switching current Isw of the switching element Q1 starts from zero.

When the switching element Q1 is turned on, the inverter circuit INV1 applies a L-level signal to the gate of the switching element Q2, thereby turning off the switching element Q2. Accordingly, the capacitor C1 is charged with the constant current Ict and the current Iasw of the MOSFET Q5. While the switching element Q1 is turned off, the switching element Q2 is turned on, thereby discharging the capacitor C1.

The comparator CP1 compares the voltage of the charged capacitor C1 and the output of the error amplifier A1, and resets the flip-flop circuit FF1 to turn off the switching element Q1 when the voltage of the charged capacitor C1 and the output of the error amplifier A1 match each other. The switching element Q2 is turned on at the same time as when the switching element Q1 is turned off, so that the capacitor C1 is discharged and its voltage Vct drops to zero. The output of the flip-flop circuit FF1 is driving the switching element Q1 through a drive circuit, and therefore the switching element Q1 is turned off when the flip-flop circuit FF1 is reset.

Based on the above operation, the ON periods of the switching element Q1 are controlled to be substantially the same in one cycle of the input AC voltage while the output voltage is controlled constant, and also the peaks of the switching current of the switching element Q1 have values proportional to the input instantaneous voltage.

Here, the current detection resistor R3 detects the switching current value Isw of the switching element Q1, and the error amplifier A2, the MOSFET Q3, the resistor R4, and the MOSFETs Q4, Q5 convert this switching current value into a correction current value Iasw.

The converted correction current value Iasw is added to the constant current Ict of the capacitor C1 which generates sawtooth waves (corresponding to the triangle-wave signals) that determine the ON periods of the switching element Q1. In this way, the larger the switching current Isw, the larger the converted current value Iasw becomes, and therefore the charging current for the capacitor C1 increases.

As a result, the voltage Vct of the capacitor C1 reaches the output of the error amplifier A1 in a shorter period of time. Specifically, as shown in FIG. 5, the ON period of the switching element Q1 is controlled such that the higher the switching current, the shorter the ON period (e.g. times t0 to t1), whereas the lower the switching current, the longer the ON period (e.g. times t6 to t7).

Figure 6:
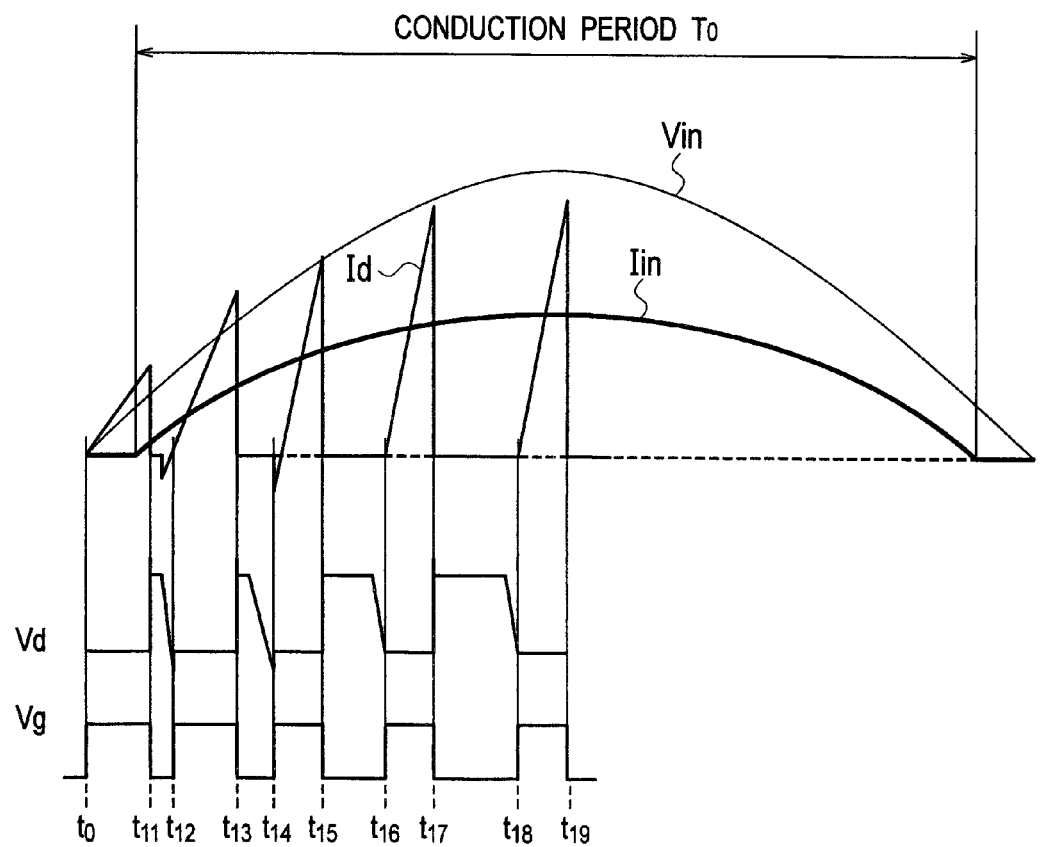
FIG. 6 shows waveform charts of an input voltage and an input current in the power-factor correction circuit according to Embodiment 1 of the present invention.

According to the power-factor correction circuit of Embodiment 1, as shown in FIG. 6, in a range where the input instantaneous voltage is high, the ON periods of the switching element Q1 are short (e.g. times t18 to t19) and Id, or the switching current, is controlled to be small in amount. As a result of the constant voltage control as a whole, the switching current Id in a range where the input instantaneous voltage is low is controlled to be large in amount.

In this way, the period for which the input current does not flow in the range where the input instantaneous voltage is low is shortened, thereby lengthening the conduction period. Accordingly, the power factor can be improved.

Meanwhile, in the power-factor correction circuit of Embodiment 1, the current detection resistor R3 for detecting the switching current is added. When the power-factor correction circuit is put into use, the switching element Q1 needs overcurrent protection, and the current detection resistor R3 can be used also as a resistor for the overcurrent protection. Thus, there is no need to add a current detection resistor particularly to the overcurrent protection.

Moreover, the power-factor correction circuit of Embodiment 1 does not involve the detection of the input voltage nor does it require an auxiliary winding of the reactor L1. Accordingly, it is possible to make a control circuit into an integrated circuit with a minimum number of terminals.

As described above, according to the power-factor correction circuit of Embodiment 1, the switching current detector 2 as a correction signal circuit detects the switching current flowing in the switching element Q1 and generates a correction signal corresponding to the detected switching current, and the ON-period control circuit 3 controls the ON period of the switching element Q1 in accordance with the error signal from the error amplifier A1 and the correction signal, the control starting from when the zero-current detector 1 detects zero current. Accordingly, it is possible to provide a power-factor correction circuit capable of widening the conduction angle and improving the power factor, without detecting the input voltage or detecting the voltage of an auxiliary winding of a reactor.

Embodiment 2

Figure 7:
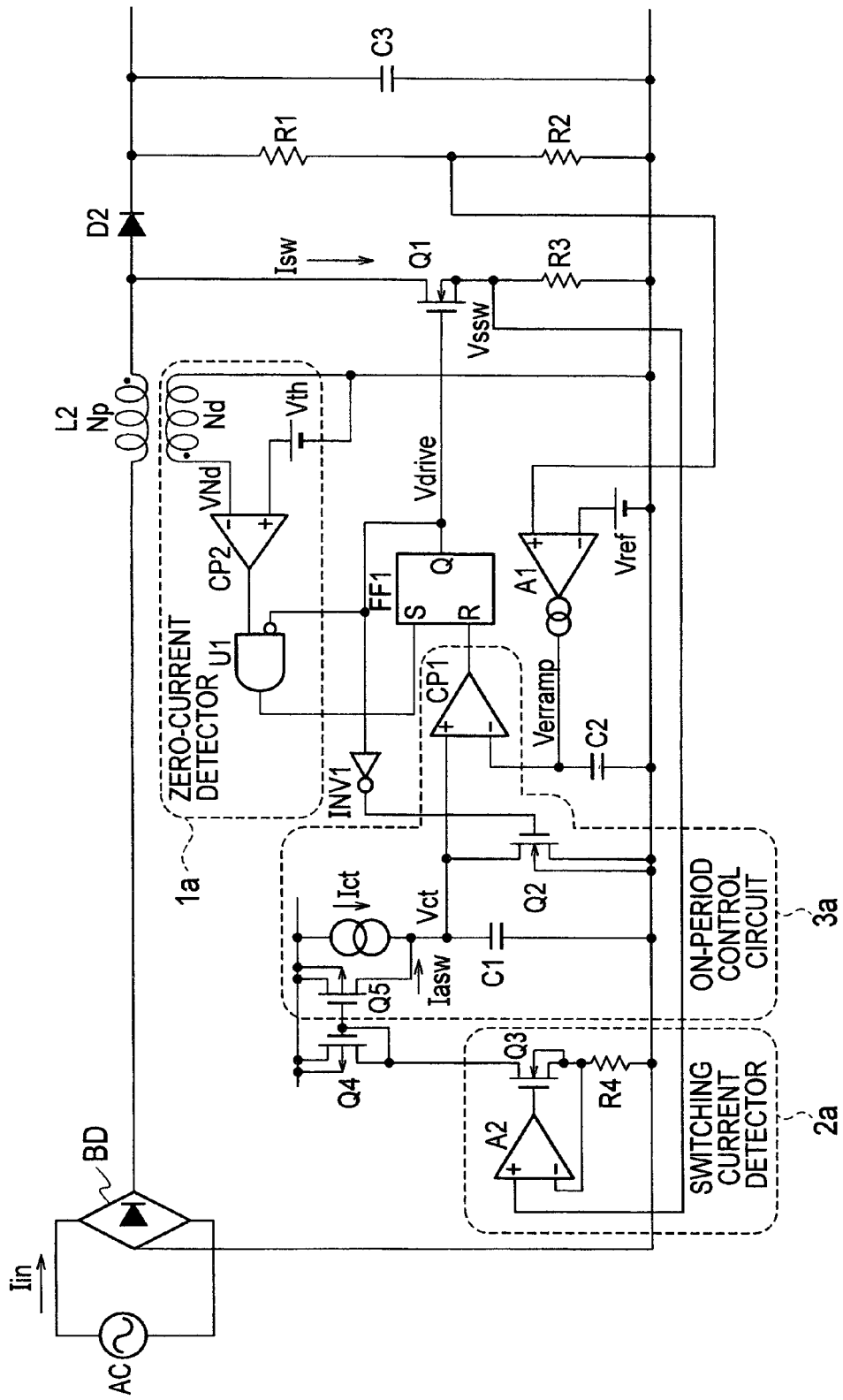
FIG. 7 is a diagram showing a power-factor correction circuit according to Embodiment 2 of the present invention.

FIG. 7 is a diagram showing a power-factor correction circuit according to Embodiment 2 of the present invention. While Embodiment 1 shown in FIG. 4 uses the zero-current detector 1, Embodiment 2 shown in FIG. 7 is characterized by using a zero-current detector 1a.

The zero-current detector 1a includes a reactor L2 including a primary winding Np and an auxiliary winding Nd, a comparator CP2, a reference power source Vth, and a logic circuit U1. The comparator CP2 is configured to compare the voltage of the auxiliary winding Nd and the reference power source Vth and output a H-level signal to the logic circuit U1 when a current flowing in the reactor L2 reaches zero. The logic circuit U1 is configured to AND the output of the comparator and an output obtained by inversing the output of a flip-flop circuit FF1, and output the AND output to a set terminal S of the flip-flop circuit FF1.

According to the power-factor correction circuit of Embodiment 2 as described above, the ON timing of a switching element Q1 are determined by detecting that the reactor current has reached zero by using the auxiliary winding Nd provided to the reactor L2.

In the power-factor correction circuit of Embodiment 2, too, an error amplifier A2 generates a correction current which is proportional to the switching current of the switching element Q1 detected based on the voltage between both ends of a current detection resistor R3, and the generated correction current is added to a current Ict of a capacitor C1 with a time constant that determines the ON period. Accordingly, the power-factor correction circuit of Embodiment 2 operates in a similar manner to the power-factor correction circuit of Embodiment 1 and can therefore achieve similar advantageous effects.

According to the present invention, the correction signal circuit detects the switching current flowing in the switching element and generates a correction signal corresponding to the detected switching signal, and the ON-period control circuit controls the ON period of the switching element in accordance with the error signal and the correction signal, the control starting from when the zero-current detector detects zero current. Accordingly, it is possible to provide a power-factor correction circuit capable of widening the conduction angle and improving the power factor, without detecting the input voltage or detecting the voltage of an auxiliary winding of a reactor.

What is claimed is:

1. A power-factor correction circuit, comprising:
   a rectifier configured to rectify an input AC voltage;
   a first series circuit including a reactor and a switching element which are connected between rectified-current output terminals of the rectifier;
   a second series circuit including a diode and a smoothing capacitor for obtaining an output voltage, the diode and the smoothing capacitor being connected in parallel to the switching element;
   an error amplifier configured to detect the output voltage as a detected output voltage, amplify an error between the detected output voltage and a reference voltage, and output an error signal;
   a zero-current detector configured to output a signal when detecting that a reactor current flowing in the reactor has become zero current;
   a correction signal circuit configured to detect a switching current flowing in the switching element as a detected switching current, and generate a correction signal corresponding to the detected switching current; and
   an ON-period control circuit configured to control an ON period of the switching element with a control in accordance with the error signal and the correction signal, the control starting from when the zero-current detector detects the zero current.

2. The power-factor correction circuit according to claim 1, further comprising:
an integration circuit configured to start integration of a constant current in response to the output of the signal of the zero-current detector; and
a comparator configured to output a signal when the error signal of the error amplifier and a value of the integration of the integration circuit match each other, wherein
the correction signal circuit adds the correction signal to the constant current of the integration circuit,
the ON-period control circuit controls the switching element such that the switching element is turned on for an ON period which is a period starting from when the zero-current detector detects the zero current to when the comparator outputs the signal thereof, and
the ON-period control circuit resets the integration circuit while the switching element is turned off.

3. The power-factor correction circuit according to claim 1, wherein
the reactor includes an auxiliary winding, and
the zero-current detector detects a voltage of the auxiliary winding of the reactor while the switching element is turned off, and detects fall of the voltage of the auxiliary winding.

4. The power-factor correction circuit according to claim 2, wherein
the reactor includes an auxiliary winding, and
the zero-current detector detects a voltage of the auxiliary winding of the reactor while the switching element is turned off, and detects fall of the voltage of the auxiliary winding.

5. The power-factor correction circuit according to claim 1, wherein the zero-current detector detects drop in a voltage of a current detection resistor connected to the switching element and a negative terminal of the rectifier, and detects the zero current when the drop in the voltage becomes zero.

6. The power-factor correction circuit according to claim 2, wherein the zero-current detector detects drop in a voltage of a current detection resistor connected to the switching element and a negative terminal of the rectifier, and detects the zero current when the drop in the voltage becomes zero.

7. A power-factor correction circuit, comprising:
a rectifier configured to rectify an input AC voltage;
a first series circuit including a reactor and a switching element which are connected between rectified-current output terminals of the rectifier;
a second series circuit including a diode and a smoothing capacitor for obtaining an output voltage, the diode and the smoothing capacitor being connected in parallel to the switching element;
an error amplifier configured to detect the output voltage as a detected output voltage, amplify an error between the detected output voltage and a reference voltage, and output an error signal;
a zero-current detector configured to output a signal when detecting that a reactor current flowing in the reactor has become zero current;
a triangle-wave generation circuit configured to generate a triangle-wave signal;
a comparison unit configured to output a signal when the triangle-wave signal of the triangle-wave generation circuit matches the error signal of the error amplifier;
a correction signal unit configured to detect a switching current flowing in the switching element as a detected switching current, and generate a correction signal corresponding to the detected switching current; and
an ON-period control circuit configured to change an ON period of the switching element based on the correction signal, the ON period being a period starting from when the zero-current detector detects zero current to when the comparison unit outputs the signal thereof.

8. The power-factor correction circuit according to claim 7, wherein the correction signal unit changes the ON period of the switching element such that the higher the switching current flowing in the switching element, the shorter the ON period.

* * * * *